United States Patent
Bilchinsky et al.

(10) Patent No.: US 11,653,425 B2
(45) Date of Patent: May 16, 2023

(54) DEVICE AND METHOD FOR CONTROLLING ENERGY

(71) Applicant: Goji Limited, Hamilton (BM)

(72) Inventors: Alexander Bilchinsky, Monosson-Yahud (IL); Eran Ben-Shmuel, Savyon (IL)

(73) Assignee: Joliet 2010 Limited, Road Town (VG)

( * ) Notice: Subject to any disclaimer, the term of this patent is extended or adjusted under 35 U.S.C. 154(b) by 540 days.

(21) Appl. No.: 16/810,056

(22) Filed: Mar. 5, 2020

(65) Prior Publication Data
US 2020/0275534 A1    Aug. 27, 2020

Related U.S. Application Data

(60) Division of application No. 15/391,029, filed on Dec. 27, 2016, now Pat. No. 10,687,395, which is a
(Continued)

(51) Int. Cl.
*H05B 6/68* (2006.01)
*H05B 6/70* (2006.01)
(Continued)

(52) U.S. Cl.
CPC ............. *H05B 6/68* (2013.01); *H05B 6/6447* (2013.01); *H05B 6/664* (2013.01); *H05B 6/687* (2013.01);
(Continued)

(58) Field of Classification Search
CPC ........ H05B 6/6447; H05B 6/664; H05B 6/68; H05B 6/687; H05B 6/688; H05B 6/70; H05B 6/705; Y02B 40/00; Y02B 40/143
(Continued)

(56) References Cited

U.S. PATENT DOCUMENTS 2,489,337 A    11/1949    Sperling
2,543,130 A    2/1951    Robertson
(Continued)

FOREIGN PATENT DOCUMENTS

CN    1397766    2/2003
CN    1968609    5/2007
(Continued)

OTHER PUBLICATIONS

EPO Communication re Summons to Attend Oral Proceedings, received in a corresponding EP patent No. 3048862 (Application No. 16155369.8), dated Mar. 23, 2021.
(Continued)

*Primary Examiner* — Quang T Van

(57) ABSTRACT

Method of irradiating a load placed in a cavity by radiating UHF or microwave radiation into the cavity. The method includes setting transmission durations, by setting for each of a plurality of frequencies, a respective transmission duration, repeatedly causing energy to be transmitted into the cavity at the plurality of frequencies according to a duty cycle, wherein the duty cycle defines an allotted transmission time for each of the plurality of frequencies, and switching ON or OFF transmission of the energy at certain frequencies, so that over a plurality of repetitions of the duty cycle the energy is transmitted at each of the plurality of frequencies for the respective transmission duration.

12 Claims, 6 Drawing Sheets

Related U.S. Application Data continuation of application No. 13/128,369, filed as application No. PCT/IL2009/001057 on Nov. 10, 2009, now abandoned.

(60) Provisional application No. 61/253,893, filed on Oct. 22, 2009, provisional application No. 61/193,248, filed on Nov. 10, 2008.

(51) Int. Cl.
  *H05B 6/64* (2006.01)
  *H05B 6/66* (2006.01)

(52) U.S. Cl.
  CPC .............. *H05B 6/688* (2013.01); *H05B 6/70* (2013.01); *H05B 6/705* (2013.01); *Y02B 40/00* (2013.01)

(58) Field of Classification Search
  USPC ....... 219/746, 745, 748, 705, 709, 710, 711, 219/716, 729, 737, 750, 756, 757, 761, 219/661; 331/183, 173, 62, 83, 177 R
  See application file for complete search history.

(56) References Cited

U.S. PATENT DOCUMENTS

| | | |
|---|---|---|
| 2,593,067 A | 4/1952 | Spencer |
| 2,895,828 A | 7/1959 | Kamide |
| 2,917,739 A | 12/1959 | Halpern |
| 3,019,399 A | 1/1962 | Lanciani et al. |
| 3,151,325 A | 9/1964 | Kompfner |
| 3,231,892 A | 1/1966 | Matson et al. |
| 3,633,538 A | 1/1972 | Hoeflin |
| 3,681,652 A | 8/1972 | Domenichini et al. |
| 3,767,884 A | 10/1973 | Osepchuk et al. |
| 3,806,689 A | 4/1974 | Kegereis et al. |
| 3,936,627 A | 2/1976 | Fitzmayer |
| 3,985,993 A | 10/1976 | Imberg et al. |
| 4,035,599 A | 7/1977 | Kashyap et al. |
| 4,081,647 A | 3/1978 | Torrey |
| 4,137,441 A | 1/1979 | Bucksbaum |
| 4,146,768 A | 3/1979 | Orke et al. |
| 4,165,454 A | 8/1979 | Carlsson et al. |
| 4,196,332 A | 4/1980 | MacKay et al. |
| 4,210,795 A | 7/1980 | Lentz |
| 4,250,628 A | 2/1981 | Smith et al. |
| 4,279,722 A | 7/1981 | Kirkbridge |
| 4,336,435 A | 6/1982 | Kashyap et al. |
| 4,342,035 A | 7/1982 | Anderson et al. |
| 4,342,896 A | 8/1982 | Teich |
| 4,354,153 A | 10/1982 | Lentz |
| 4,371,770 A | 2/1983 | Gilliatt |
| 4,377,733 A | 3/1983 | Yamaguchi et al. |
| 4,415,789 A | 11/1983 | Nobue et al. |
| 4,418,262 A | 11/1983 | Noda |
| 4,431,888 A | 2/1984 | Simpson |
| 4,447,693 A | 5/1984 | Buck |
| 4,464,554 A | 8/1984 | Bakanowski et al. |
| 4,471,194 A | 9/1984 | Hosokawa et al. |
| 4,475,024 A | 10/1984 | Tateta |
| 4,485,285 A | 11/1984 | Machesne |
| 4,488,027 A | 12/1984 | Dudley et al. |
| 4,507,530 A | 3/1985 | Smith |
| 4,508,948 A | 4/1985 | Carlson |
| 4,517,429 A | 5/1985 | Horinouchi |
| 4,568,810 A | 2/1986 | Carmean |
| 4,589,423 A | 5/1986 | Turner |
| 4,596,915 A | 6/1986 | Simpson |
| 4,602,141 A | 7/1986 | Naito et al. |
| 4,695,694 A | 9/1987 | Hill et al. |
| 4,794,218 A | 12/1988 | Nakano et al. |
| 4,822,968 A | 4/1989 | Chin |
| 4,855,555 A | 8/1989 | Adams et al. |
| 4,897,151 A | 1/1990 | Killackey et al. |
| 4,931,798 A | 6/1990 | Kogo |
| 4,939,331 A | 7/1990 | Berggren et al. |
| 5,008,506 A | 4/1991 | Asmussen et al. |
| 5,036,171 A | 7/1991 | Kim et al. |
| 5,036,172 A | 7/1991 | Kokkeler et al. |
| 5,066,503 A | 11/1991 | Rouzi |
| 5,074,200 A | 12/1991 | Rouzi |
| 5,146,059 A | 9/1992 | Seog Tae |
| 5,191,182 A | 3/1993 | Galorme et al. |
| 5,202,095 A | 4/1993 | Houchin et al. |
| 5,293,019 A | 5/1994 | Lee |
| 5,321,222 A | 6/1994 | Bible et al. |
| 5,321,897 A | 6/1994 | Holst et al. |
| 5,451,751 A | 9/1995 | Takimoto |
| 5,468,940 A | 11/1995 | Kang |
| 5,512,736 A | 4/1996 | Kang et al. |
| 5,521,360 A | 5/1996 | Johnson et al. |
| 5,558,800 A | 9/1996 | Page |
| 5,616,268 A | 4/1997 | Carr |
| 5,632,921 A | 5/1997 | Risman et al. |
| 5,698,128 A | 12/1997 | Sakai et al. |
| 5,721,286 A | 2/1998 | Lauf et al. |
| 5,789,724 A | 8/1998 | Lerssen et al. |
| 5,798,395 A | 8/1998 | Lauf et al. |
| 5,804,801 A | 9/1998 | Lauf et al. |
| 5,812,393 A | 9/1998 | Drucker |
| 5,818,649 A | 10/1998 | Anderson |
| 5,828,040 A | 10/1998 | Risman |
| 5,828,042 A | 10/1998 | Choi et al. |
| 5,834,744 A | 11/1998 | Risman |
| 5,873,254 A | 2/1999 | Arav |
| 5,877,479 A | 3/1999 | Yu |
| 5,883,801 A | 3/1999 | Drucker et al. |
| 5,927,265 A | 7/1999 | McKee et al. |
| 5,942,144 A | 8/1999 | Lee |
| 5,958,278 A | 9/1999 | Engebritson et al. |
| 5,961,871 A | 10/1999 | Bible et al. |
| 5,977,532 A | 11/1999 | Ekemar |
| 5,981,927 A | 11/1999 | Osepchuk et al. |
| 5,981,928 A | 11/1999 | Lee |
| 5,986,249 A | 11/1999 | Yoshino et al. |
| 5,998,775 A | 12/1999 | Sung |
| 6,060,701 A | 5/2000 | McKee et al. |
| 6,096,361 A | 8/2000 | Yamane et al. |
| 6,104,018 A | 8/2000 | Varma et al. |
| 6,114,677 A | 9/2000 | Idomoto et al. |
| 6,166,551 A | 12/2000 | Scott et al. |
| 6,169,277 B1 | 1/2001 | Feher et al. |
| 6,172,348 B1 | 1/2001 | Yoshino et al. |
| 6,191,402 B1 | 2/2001 | Ekemar |
| 6,222,170 B1 | 4/2001 | Tucker et al. |
| 6,225,940 B1 | 5/2001 | Ohlsen |
| 6,249,710 B1 | 6/2001 | Drucker et al. |
| 6,252,206 B1 | 6/2001 | Leukhardt, III et al. |
| 6,262,406 B1 | 7/2001 | McKee et al. |
| 6,263,830 B1 | 7/2001 | Kamarehi et al. |
| 6,268,596 B1 | 7/2001 | Lauf et al. |
| 6,274,859 B1 | 8/2001 | Yoshino et al. |
| 6,320,165 B1 | 11/2001 | Ovadia |
| 6,320,171 B1 | 11/2001 | Kim |
| 6,384,392 B1 | 5/2002 | Lee et al. |
| 6,444,966 B2 | 9/2002 | Mukumoto et al. |
| 6,462,320 B1 | 10/2002 | Fuls et al. |
| 6,476,766 B1 | 11/2002 | Cohen |
| 6,487,950 B2 | 12/2002 | Samland |
| 6,537,492 B1 | 3/2003 | Sogaard |
| 6,563,097 B2 | 5/2003 | Taino et al. |
| 6,576,879 B1 | 6/2003 | Hoh |
| 6,586,714 B2 | 7/2003 | Kawamura et al. |
| 6,590,192 B2 | 7/2003 | Taino et al. |
| 6,614,011 B2 | 9/2003 | Omori et al. |
| 6,657,173 B2 | 12/2003 | Flugstad et al. |
| 6,674,056 B2 | 1/2004 | Lee |
| 6,680,467 B1 | 1/2004 | Whipple, Jr. |
| 6,686,567 B1 | 2/2004 | Hwang |
| 6,720,541 B2 | 4/2004 | Watanabe et al. |
| 6,770,859 B2 | 8/2004 | Kang |
| 6,812,442 B2 | 11/2004 | Kim et al. |
| 6,812,443 B2 | 11/2004 | Noda et al. |

(56) References Cited

U.S. PATENT DOCUMENTS

| | | |
|---|---|---|
| 6,815,644 B1 | 11/2004 | Muegge et al. |
| 6,838,648 B2 | 1/2005 | Watanabe et al. |
| 6,861,632 B2 | 3/2005 | Lee |
| 6,867,402 B1 | 3/2005 | Schulte |
| 6,874,495 B2 | 4/2005 | McFadden |
| 6,880,545 B2 | 4/2005 | Heber et al. |
| 6,884,979 B1 | 4/2005 | Torngren et al. |
| 6,914,226 B2 | 7/2005 | Ottaway |
| 6,927,374 B2 | 8/2005 | Hu et al. |
| 6,982,401 B2 | 1/2006 | Hu et al. |
| 7,015,443 B2 | 3/2006 | Whipple, Jr. |
| 7,030,347 B2 | 4/2006 | Lee et al. |
| 7,053,346 B2 | 5/2006 | Cheng et al. |
| 7,053,348 B1 | 5/2006 | Terada et al. |
| 7,055,518 B2 | 6/2006 | McFadden et al. |
| 7,078,661 B2 | 7/2006 | Kim et al. |
| 7,080,593 B1 | 7/2006 | Frankel |
| 7,087,872 B1 | 8/2006 | Dobie et al. |
| 7,091,460 B2 | 8/2006 | Kinzer |
| 7,105,787 B2 | 9/2006 | Clemen, Jr. |
| 7,105,789 B2 | 9/2006 | Ekemar |
| 7,109,457 B2 | 9/2006 | Kinzer |
| 7,145,119 B1 | 12/2006 | Kim et al. |
| 7,166,824 B2 | 1/2007 | Kanzaki et al. |
| 7,199,341 B2 | 4/2007 | Kaneko et al. |
| 7,207,486 B1 | 4/2007 | Bennett |
| 7,208,710 B2 | 4/2007 | Gregoire et al. |
| 7,235,763 B2 | 6/2007 | Christiaansen et al. |
| 7,258,881 B2 | 8/2007 | Jones et al. |
| 7,360,533 B2 | 4/2008 | McFadden |
| 7,361,866 B2 | 4/2008 | Chun |
| 7,388,180 B2 | 6/2008 | Kim et al. |
| 7,409,311 B2 | 8/2008 | Imgram et al. |
| 7,473,869 B2 | 1/2009 | Chun |
| 7,490,538 B2 | 2/2009 | Lowell et al. |
| 7,612,315 B2 | 11/2009 | Corradini |
| 7,626,468 B2 | 12/2009 | Staines |
| 7,629,921 B1 | 12/2009 | Manry et al. |
| 7,994,962 B1 | 8/2011 | Ben-Shmuel |
| 8,207,479 B2 | 6/2012 | Ben-Shmuel et al. |
| 8,389,916 B2 | 3/2013 | Ben-Shmuel et al. |
| 8,759,729 B2 | 6/2014 | Ben-Shmuel et al. |
| 2001/0020616 A1 | 9/2001 | Drozd et al. |
| 2002/0018138 A1 | 2/2002 | Yoshiro |
| 2003/0015525 A1 | 1/2003 | Yamauchi et al. |
| 2003/0047559 A1 | 3/2003 | Watanabe et al. |
| 2003/0068414 A1 | 4/2003 | Ito |
| 2003/0183972 A1 | 10/2003 | Weber et al. |
| 2004/0074401 A1 | 4/2004 | McMaster et al. |
| 2004/0134904 A1 | 7/2004 | Clemen, Jr. |
| 2004/0206755 A1 | 10/2004 | Hadinger |
| 2004/0211765 A1 | 10/2004 | McFadden |
| 2004/0216732 A1 | 11/2004 | McFadden |
| 2005/0080373 A1 | 4/2005 | Wang |
| 2005/0092314 A1 | 5/2005 | Rabas et al. |
| 2005/0092844 A1 | 5/2005 | Zhang et al. |
| 2005/0139686 A1 | 6/2005 | Helmer et al. |
| 2005/0178841 A1 | 8/2005 | Jones, II et al. |
| 2006/0006173 A1 | 1/2006 | Kim et al. |
| 2006/0049725 A1 | 3/2006 | Simon |
| 2006/0186115 A1 | 8/2006 | Joines et al. |
| 2006/0259547 A1 | 11/2006 | Bogatin et al. |
| 2006/0278710 A1 | 12/2006 | Park et al. |
| 2006/0289508 A1 | 12/2006 | Kim |
| 2006/0289526 A1 | 12/2006 | Takizaki et al. |
| 2007/0007279 A1 | 1/2007 | Chun et al. |
| 2007/0007348 A1 | 1/2007 | Shah |
| 2007/0012690 A1 | 1/2007 | Sim et al. |
| 2007/0012789 A1 | 1/2007 | Hartney et al. |
| 2007/0039940 A1 | 2/2007 | Kim et al. |
| 2007/0039949 A1 | 2/2007 | Wilson |
| 2007/0137633 A1 | 6/2007 | McFadden |
| 2007/0215608 A1 | 9/2007 | Yoshino et al. |
| 2007/0215612 A1 | 9/2007 | Hicks et al. |
| 2007/0251941 A1 | 11/2007 | Givens |
| 2007/0272684 A1 | 11/2007 | Lee |
| 2007/0278218 A1 | 12/2007 | Claesson et al. |
| 2008/0047948 A1 | 2/2008 | Rosenbloom et al. |
| 2008/0047959 A1 | 2/2008 | Moriya et al. |
| 2008/0087662 A1 | 4/2008 | Takizaki et al. |
| 2008/0105136 A1 | 5/2008 | McFadden |
| 2008/0105675 A1 | 5/2008 | Choi et al. |
| 2008/0106483 A1 | 5/2008 | McFadden et al. |
| 2008/0160967 A1 | 7/2008 | Narasimhan et al. |
| 2008/0193614 A1 | 8/2008 | Greiner et al. |
| 2008/0206420 A1 | 8/2008 | McFadden |
| 2008/0264269 A1 | 10/2008 | Sterzel et al. |
| 2008/0266012 A1 | 10/2008 | Yahata et al. |
| 2008/0280000 A1 | 11/2008 | Breunig et al. |
| 2008/0290087 A1 | 11/2008 | Ben-Shmuel et al. |
| 2008/0290178 A1 | 11/2008 | Reynolds et al. |
| 2008/0296284 A1 | 12/2008 | McFadden et al. |
| 2009/0014315 A1 | 1/2009 | Chen |
| 2009/0045191 A1 | 2/2009 | Ben-Shmuel et al. |
| 2009/0057302 A1 | 3/2009 | Ben-Shmuel et al. |
| 2009/0071110 A1 | 3/2009 | Gonze et al. |
| 2009/0236333 A1 | 9/2009 | Ben-Shmuel et al. |
| 2009/0236334 A1 | 9/2009 | Ben-Shmuel et al. |
| 2009/0236335 A1 | 9/2009 | Ben-Shmuel et al. |
| 2009/0256706 A1 | 10/2009 | Brown |
| 2009/0274802 A1 | 11/2009 | Kling et al. |
| 2010/0123001 A1 | 5/2010 | Park |
| 2010/0155392 A1 | 6/2010 | Nordh et al. |
| 2010/0176121 A1 | 7/2010 | Nobue et al. |
| 2010/0176123 A1 | 7/2010 | Mihara et al. |
| 2010/0224623 A1 | 9/2010 | Yasui et al. |
| 2010/0237067 A1 | 9/2010 | Nordh et al. |
| 2010/0252551 A1 | 10/2010 | Nordh et al. |
| 2011/0108548 A1 | 5/2011 | Nobue et al. |
| 2011/0114633 A1 | 5/2011 | Niklasson |
| 2011/0168699 A1 | 7/2011 | Oomori et al. |
| 2011/0198343 A1 | 8/2011 | Bilchinsky et al. |
| 2012/0097669 A1 | 4/2012 | Sim et al. |
| 2012/0103972 A1 | 5/2012 | Okajima |
| 2012/0125921 A1 | 5/2012 | Shim et al. |
| 2012/0152940 A1 | 6/2012 | Oomori et al. |
| 2013/0008896 A1 | 1/2013 | Oomori et al. |
| 2013/0062334 A1 | 3/2013 | Bilchinsky et al. |
| 2013/0146590 A1 | 6/2013 | Einziger et al. |
| 2014/0063676 A1 | 3/2014 | Sigalov et al. |
| 2017/0294316 A1* | 10/2017 | Kim ................ H01L 29/7869 |

FOREIGN PATENT DOCUMENTS

| | | |
|---|---|---|
| CN | 101513118 | 8/2009 |
| DE | 102007025245 | 10/2007 |
| DE | 102007025262 | 10/2007 |
| DE | 102007025263 | 10/2007 |
| DE | 102007025264 | 10/2007 |
| DE | 102007035357 | 2/2009 |
| DE | 102007035359 | 2/2009 |
| DE | 102007051638 | 8/2009 |
| EP | 0268379 | 5/1988 |
| EP | 0296527 | 12/1988 |
| EP | 0429822 | 6/1991 |
| EP | 0615763 | 9/1994 |
| EP | 0752195 | 1/1997 |
| EP | 0934681 | 8/1999 |
| EP | 1174667 A1 | 1/2002 |
| EP | 1515102 | 3/2005 |
| EP | 1708118 A2 | 10/2006 |
| EP | 2051564 | 8/2007 |
| EP | 2205043 | 10/2008 |
| EP | 2053315 | 4/2009 |
| EP | 2098788 | 9/2009 |
| GB | 1465106 | 2/1977 |
| GB | 2391154 | 1/2004 |
| JP | 52-014946 | 2/1977 |
| JP | 57-194500 | 11/1982 |
| JP | 58-111295 | 7/1983 |
| JP | 60-193292 | 10/1985 |
| JP | 63-255783 A | 10/1988 |
| JP | 1-159388 U1 | 11/1989 |
| JP | 04-259789 | 9/1992 |

(56) References Cited

FOREIGN PATENT DOCUMENTS

| | | |
|---|---|---|
| JP | 04-299282 | 10/1992 |
| JP | 6-193884 A | 7/1994 |
| JP | 06-215871 | 8/1994 |
| JP | 06-251866 | 9/1994 |
| JP | 06-310268 | 11/1994 |
| JP | 6-310268 | 11/1994 |
| JP | 07-18553 | 3/1995 |
| JP | 8-64359 | 3/1996 |
| JP | 9-229372 | 9/1997 |
| JP | 10-196966 | 7/1998 |
| JP | 2001-086967 | 4/2001 |
| JP | 2001-317741 | 11/2001 |
| JP | 2002-37420 A1 | 2/2002 |
| JP | 2002-243161 A1 | 8/2002 |
| JP | 2002-280159 | 9/2002 |
| JP | 2002-532239 | 10/2002 |
| JP | 2002-535595 | 10/2002 |
| JP | 2004-171852 | 6/2004 |
| JP | 2005-228604 | 8/2005 |
| JP | 2006-511042 | 3/2006 |
| JP | 2008-034244 | 2/2008 |
| JP | 2008-269793 | 11/2008 |
| JP | 2008-310969 | 12/2008 |
| JP | 2009-527883 | 7/2009 |
| JP | 2009-259511 | 11/2009 |
| WO | WO 1991/007069 | 5/1991 |
| WO | WO 1995/27387 | 10/1995 |
| WO | WO 1995/27388 | 10/1995 |
| WO | WO 1997/36728 | 10/1997 |
| WO | WO 1998/35532 | 8/1998 |
| WO | WO 1999/13688 | 3/1999 |
| WO | WO 2000/36880 | 6/2000 |
| WO | 00/42824 | 7/2000 |
| WO | WO 2002/023953 | 3/2002 |
| WO | WO 2003/056919 | 7/2003 |
| WO | WO 2004/054705 A1 | 7/2004 |
| WO | WO 2004/059563 | 7/2004 |
| WO | WO 2005/027644 | 3/2005 |
| WO | WO 2005/041672 | 5/2005 |
| WO | WO 2005/073449 | 8/2005 |
| WO | WO 2008/102360 | 8/2005 |
| WO | WO 2006/016372 | 2/2006 |
| WO | WO 2007/018565 | 2/2007 |
| WO | WO 2007/095904 | 8/2007 |
| WO | WO 2007/096877 | 8/2007 |
| WO | WO 2007/096878 A2 | 8/2007 |
| WO | WO 2005/106333 | 9/2007 |
| WO | WO 2008/007368 | 1/2008 |
| WO | WO 2008/018466 | 2/2008 |
| WO | WO 2008/048497 | 4/2008 |
| WO | WO 2008/087618 | 7/2008 |
| WO | 2008/102360 | 8/2008 |
| WO | WO 2008/102334 | 8/2008 |
| WO | WO 2008/143942 | 11/2008 |
| WO | WO 2008/145213 | 12/2008 |
| WO | WO 2008/145214 | 12/2008 |
| WO | WO 2008/145216 | 12/2008 |
| WO | WO 2008/145217 | 12/2008 |
| WO | WO 2009/050893 | 4/2009 |
| WO | WO 2009/080344 | 7/2009 |
| WO | WO 2009/104191 | 8/2009 |
| WO | WO 2010/052724 | 5/2010 |
| WO | WO 2010/052725 | 5/2010 |
| WO | WO 2010/147439 A2 | 12/2010 |

OTHER PUBLICATIONS

EPO opposition document dated Jul. 28, 2020 and issued in EP Application No. 16155369.
Opposition document dated Apr. 18, 2018 (5 pages).
EPO Opposition document dated Nov. 24, 2017 (8 pages).
EPO Opposition document dated Apr. 23, 2018 (8 pages).
EPO Opposition document dated Apr. 26, 2018 (6 pages).
Notice of Opposition document (7 pages).
Opposition document labeled Annex 1 (8 pages).
Notice of Opposition document (6 pages).
Opposition document labeled Annex A1 (1 page).
Opposition document labeled Annex A2 (1 page).
Opposition document dated Jan. 26, 2017 (27 pages).
EPO Opposition document dated Mar. 6, 2017 (1 page).
Opposition document with First, Third, Fourth, Fifth and Second Auxiliary claims (15 pages).
EPO Opposition document dated Nov. 24, 2017 (7 pages).
Office Action dated Dec. 9, 2015 in related Chinese Application No. 201080050438 with English language translation.
Adams "Microwave Blood Plasma Defroster", Journal of Microwave Power and Electromagnetic Energy, 26(3): 156-159, 1991.
Arens et al. "Danger of Over warming Blood by Microwave", JAMA, 218(7): 1045-1046, 718, Nov. 15, 1971.
Bird "Antenna Feeds", Encyclopedia of Radiofrequency and Macrowave Engineering, p. 185-217, 2005.
Boström et al. "Rapid Thawing of Fresh-Frozen Plasma With Radio Wave-Based Thawing Technology and Effects on Coagulation Factors During Prolonged Storage at 4° C.", Vox Sanguinis, 97: 34-35, 2009.
Collin "Electromagnetic Theory: Wave Equation", Foundations for Microwave Engineering, IEEE Press Series on Electromagnetic Wave Theory, 2nd Ed., Chap.2.4: 31 -32, 2001.
Collin "Transmission Lines and Waveguides", Foundations for Microwave Engineering, IEEE Press Series on Electromagnetic Wave Theory, 2nd Ed., p. 96-99, 2001.
Collin, R.E., "Chapter 4: Circuit Theory for Waveguiding Systems," Foundations of Microwave Engineering, 2nd ed. IEEE Press Series on electromagnetic wave theory, pp. 233-254, 2001.
Communication Pursuant to Article 94(3) EPC dated Apr. 29, 2010 From the European Patent Office Re.: Application No. 07706172.9.
Communication Pursuant to Article 94(3) EPC, dated Mar. 26, 2012 Re: European Application No. 09 793 620.7-2214, 5 pages.
Decision revoking of the corresponding European Patent No. 2356879, dated Oct. 8, 2015, together with the Minutes of the Oral Proceedings.
English language translation of Argument filed in JP 2012-179718, dated Jun. 13, 2014.
English Translation of Japanese Office Action dated Feb. 14, 2014 in a related Japanese Application No. 2012-538460.
English Translation of Notice of Reason for Rejection, dated Feb. 24, 2012 Re: Japanese Application No. 2008-555943, 5 pages.
EPO Communication in corresponding EP Application No. 12182015.3, dated Feb. 26, 2014, 7 pages.
European Search Report issued in European Patent Application No. 12197455.4, dated Sep. 18, 2013, 7 pages.
Evans "Electromagnetic Rewarming: The Effect of CPA Concentration and Radio Source Frequency on Uniformity and Efficiency of Heating", Cryobiology, 40: 126-138, 2000.
Evans et al. "Design of A UHF Applicator for Rewarming of Cryopreserved Biomaterials", IEEE Transactions on Biomedical Engineering, 39(3): 217-225, Mar. 1992.
Extended European Search Report in a related European Application No. 10829614.6 dated Nov. 27, 2014.
Final Office Action (English) in corresponding Korean Application No. 10-2011-7013114, dated Apr. 22, 2015.
First Notice of Opposition filed by Whirlpool Europe s.r.l. in EP2356879, dated Jul. 22, 2013, 18 pages.
First Office Action dated Dec. 18, 2013 in a related Chinese Apptication No. 201080050438.0.
Foster et al. "Biological Effects of Radiofrequency Energy As Related to Health and Safety", Encyclopedia of Radiofrequency and Macrowave Engineering, p. 511-523, 1999.
Foster et al. "Dielectric Properties of Tissues", Handbook of Biological Effects of Electromagnetic Fields, CRC Press, 2nd Ed.(Chap. I): 25-101, 1996.
Geedipalli et al. "Heat Transfer in a Combination Microwave-Jet Impingement Oven", Food and Bioproducts Processing, 86: 53-63, 2008.
Hambting "Forget Lasers, Phasers and Other Beam Weapons—Radiofrequency Devices Are Here, and They're Set to 'Sting'", Tech Watch: Forecasting Pain, 183(12): 32, Dec. 2006.

(56) References Cited

OTHER PUBLICATIONS

Herring et al. "OSU Tunes Into A Cooking Innovation", OSU News & Communication Services, Oregon State University, 2 P., Apr. 30, 2004.
Hirsch et al. "Indicators of Erythocyte Damage After Microwave Warming of Packed Red Blood Cells", Clinical Chemistry, 49(5): 792-799, 2003.
Hirsch et al. "Temperature Course and Distribution During Plasma Heating With A Microwave Device", Anaesthesia, 58: 444-447, 2003.
Informational Sheet for JP 58-111295, dated Jul. 2, 1983.
International Preliminary Report on Patentability and Written Opinion dated Aug. 26, 2008 From the International Preliminary Examining Authority Re.: Application No. PCT/IL2007/000235.
International Preliminary Report on Patentability and Written Opinion dated Aug. 26, 2009 From the International Bureau of WIPO Re.: Application No. PCT/IL2007/001073.
International Preliminary Report on Patentability and Written Opinion dated Jan. 13, 2009 From the International Bureau of WIPO Re.: Application No. PCT/IL2007/000864.
International Preliminary Report on Patentability and Written Opinion dated Aug. 26, 2009 From the International Preliminary Examining Authority Re.: Application No. PCT/IL2008/000231.
International Preliminary Report on Patentability dated May 29, 2008 From the International Preliminary Examining Authority Re.: Application No. PCT/IL2007/000236.
International Preliminary Report on Patentability issued in International Application No. PCT/IL2010/000380, dated May 15, 2012, 7 pages.
International Search Report and the Written Opinion dated Jun. 24, 2010 From the International Searching Authority Re.: Application No. PCT/IL2009/001059.
International Search Report and the Written Opinion dated Nov. 25, 2009 From the International Searching Authority Re.: Application No. PCT/IL2009/000199.
International Search Report and Written Opinion dated Mar. 3, 2010 From the International Searching Authority Re.: Apptication No. PCT/IL2009/001057.
International Search Report and Written Opinion dated Sep. 11, 2007 From the International Searching Authority by the Patent Cooperation Treaty Re.: Application No. PCT/IL2007/000235.
International Search Report and Written Opinion dated Nov. 13, 2008 From the International Searching Authority Re.: Application No. PCT/IL2008/000231.
International Search Report and Written Opinion dated Jun. 15, 2010 From the International Searching Authority Re.: Application No. PCT/IL2009/001058.
International Search Report and Written Opinion dated May 20, 2008 From the International Searching Authority by the Patent Cooperation Treaty Re.: Application No. PCT /IL2007/001073.
International Search Report and Written Opinion dated Dec. 27, 2007 From the International Searching Authority by the Patent Cooperation Treaty Re.: Application No. PCT/IL2007/000864.
International Search Report and Written Opinion dated Aug. 31, 2007 From the International Searching Authority by the Patent Cooperation Treaty Re.: Application No. PCT/IL20007/000236.
International Search Report and Written Opinion regarding International Application No. PCT/IL10100380, dated Aug. 30, 2010, 12 pages.
International Search Report and Written Opinion regarding International Application No. PCT/IL1 0100381, dated Sep. 1, 2010, 124 pages.
Invitation to Indicate Subject Matter to be searched for European Patent Application No. 12197455.4 dated May 29, 2013, 3 pages.
Invitation to Indicate Subject Matter to be searched for European Patent Application No. 12182015.3, dated Feb. 5, 2013, 5 pages.
J.R. Bows, "Variable Frequency Microwave Heating of Food", Journal of Microwave Power and Electromagnetic Energy, 34(4): 227-238, Jan. 1, 1999, XP055102944.
Khummongkol et al. "Heat Transfer Between Impinging Air and Impinged Surface: A Factorial Design", The Joint International Conference on 'Sustainable Energy and Environment (SEE)', Hua Hin, Thailand, Dec. 1-3, 2004, 4-003(O): 431-436, 2004.
Kim, J. et al., "Novel Microstrip-to-Stripline Transitions for Leakage Suppression in Multilayer Microwave Circuits."
Kusama, Y. et al., "A Study on the Door Seal Structure of a Microwave Oven Using the Finite-Difference Time-Domain Method," *Microwave and Optical Technology Letters*, vol. 19, No. 5, Dec. 5, 1998.
Kusama, Y. et al., "Analysis of Door Seal Structure of Microwave Oven with Consideration of Higher Modes by the FDTD Method," *Electronics and Communications in Japan*, Part 2, vol. 85, No. 3, 2002.
Kusama, Y. et al., "Size Reduction of the Door Seal Structure of a Microwave Oven by the FDTD Method," *Electronics and Communications in Japan*, Part 2, vol. 86, No. 10, 2003.
Lapin N9GL's RF Safety col. The Military's New RF Weapon, ARRL Handbook for Radio Amateurs, ARRL Web: N9GL's RF Safety Column: The Military's New RF Weapon.
Lee, G. et al., "Suppression of the CPW Leakage in Common Millimeter-Wave Flip-Chip Structures," *IEEE Microwave and Guided Wave Letters*, vol. 8, No. 11, Nov. 11, 1998.
Liang et al. "Multiband Characteristics of Two Fractal Antennas", Microwave and Oprical Technology Letters, 23(4): 242-245, Nov. 20, 1999.
Marcroft et al. "Flow Field in A Hot Air Jet Impingement Oven—Part II: Multiple Impingement Jets", Journal of Food Processing Preservation, 23: 235-248, 1999.
Marcroft et al. "Flow Held in A Hot Air Jet Impingement Oven—Part I: A Single Impinging Jet", Journal of Food Processing Preservation, 23: 217-233, 1999.
Matsumoto, K. et al., "An Analysis of a Door Seal Structure of a Microwave Oven with an Inserted Sheet-Type Lossy Material Using FDTD Method," *Electronics and Communications in Japan*, Part 1, vol. 85, No. 9, 2002.
Matsumoto, K. et al., "An efficient Analysis on Door structure of Microwave Oven Using Combined waves of High Order Modes," *33rd European Microwave Conference*, Munich, 2003.
Mett, R. R. et al., "Microwave leakage from field modulation slots in TE011 electron paramagnetic resonance cavities," *Review of Scientific Instruments* 76, 014702, 2005.
Notice of Defects issued from the Israeli Patent Office in corresponding Israeli Patent Application No. 193581, dated Sep. 26, 2011, 2 pgs (including translation).
Notice of Reason for Rejection issued by the Japanese Patent Office on Feb. 6, 2013 in corresponding Japanese Application No. JP 2011-535209, 3 pages.
Office Action (Engfish) in corresponding Korean Application No. 10-2011-7013114, dated Dec. 29, 2014.
Office Action in a related Chinese Application No. 200980154040.9, with English language summary, dated Mar. 25, 2014.
Office Action in JP 2012-179718, with English language translation, dated Mar. 10, 2014.
Office Action issued by the Chinese State Intellectual Property Office dated Dec. 21, 2012 in corresponding Chinese Application No. 200980154040.9, 11 pages.
Official Action dated Nov. 10, 2011 From the US Patent and Trademark Office Re.: U.S. Appl. No. 12/899,348.
Official Action dated Jul. 14, 2010 From the State IP Office, P.R. China Re.: Application No. 200780014028.9, 9 pages (including translation).
Official Action dated Nov. 22, 2011 From the US Patent and Trademark Office Re.: U.S. Appl. No. 12/907,663.
Official Action dated Jun. 28, 2011 From the US Patent and Trademark Office Re.: U.S. Appl. No. 12/222,948.
Penfold et al. "Control of Thermal Runaway and Uniformity of Heating in the Electromagnetic Rewarming of a Cryopreserved Kidney Phantom", Cryobiology, 30: 493-508, 1993.
Pozar, D.M., "Chapter 4: Microwave Network analysis," *Microwave Engineering*, 2nd ed., John Wiley & Sons, Inc., pp. 190-211, 1998.

(56) References Cited

OTHER PUBLICATIONS

Rabinovitch, J., "New Design for the Mk Irf Finger Contacts in the LHC."

Repacholi "Radiofrequency Electromagnetic Field Exposure Standards", IEEE Engineering in Medicine and Biology Magazine, p. 18-21, Mar. 1987.

Response dated Feb. 23, 2010 to the Written Opinion dated Nov. 25, 2009 From the International Searching Authority Re.: Application No. PCT/IL2009/000199.

Risco "Microwaves and Vascular Perfusion: Obtaining Very Rapid Organ Cooling", Cryobiology, 49: 294, Abstract No. 11, 2004.

Robinson et al. "Electromagnetic Re-Warming of Cryopreserved Tissues: Effect of Choice of Cryoprotectant and Sample Shape on Uniformity of Heating", Physics in Medicine and Biology. 47: 2311-2325, 2002.

Robinson et al. "Rapid Electromagnetic Wanning of Cells and Tissues", IEEE Transactions on Biomedical Engineering, 46(12): 1413-1425, Dec. 1999.

Rocha, A. M. et al., "Optimization of a door seal structure of a microwave oven using a FDTD method," *International Journal of Numerical Modeling: Electronic Networks, Devices and Fields*, Int. J. Numer. Model. 2008; 21:507-513, Jul. 21, 2008.

Schwan et al. "RF-Field Interactions With Biological Systems: Electrical Properties and Biophysical Mechanisms", Proceedings of the IEEE, 68(1): 104-113, Jan. 1980.

Scott "Understanding Microwaves", A Wiley-Interscience Publication, 1: 326-331, 1993.

Second Notice of Opposition filed by Dr. Felix Gross Europe s.r.l. in EP2356879, dated Aug. 21, 2013, 14 pages.

Second Notice of Opposition filed by Whirlpool Europe s.r.l. in EP2356879, dated Aug. 21, 2013, 14 pages.

Second Office Action dated Sep. 2, 2014 in a related Chinese Application No. 201080050438.0.

Second Office Action issued by the Chinese State Office of Intellectual Property in Chine se Application No. 200980154040.9, dated Jul. 25, 2013, 6 pages.

Shelley "Inside View on Deep Heat", Eureka Innovative Engineering Design, 2 P., May 14, 2007.

Sherman et al. "A New Rapid Method for Thawing Fresh Frozen Plasma", Transfusion, 14(6): 595-597, Nov.-Dec. 1974.

Söhngen et al. "Thawing of Fresh-Frozen Plasma With A New Microwave Oven", Transfusion, 28(6): 576-580, 1988.

Swain et al., "What is the most energy efficient method of cooking a 'British' roast dinner?," *University of Bristol Fryers Research Project*, Feb. 29, 2008.

Tomiyasu, K., "Minimizing Radiation Leakage from Microwave Ovens," *IEEE Microwave Magazine*, Feb. 1, 2008.

Umashankar, K. et al., "A Novel Method to Analyze Electromagnetic Scattering of Complex Objects," *IEEE Transactions on Electromagnetic Compatibility*, vol. EMC-24, No. 4, Nov. 1, 1982.

Umishita, K. et al., "Absorption and Shielding Effect of Electromagnetic Wave at GHz Frequency by Multi-walled Carbon Nanotube/Polymer Composites," *Proceedings of the 9th European Conference on Wireless Technology*, Sep. 1, 2006.

Von Hippel "Theory: A. Macroscopic Properties of Dielectrics. Comples Permittivity and Permeability", Dielectric Materials and Applications, 1:3-5, 1995.

Walker et al. "Fractal Volume Antennas", Electronics Letters, 34(16): 1536-1537, Aug. 6, 1998.

Wusteman et al. "Vitrification of Large Tissues With Dielectric Warming: Biological Problems and Some Approaches to Their Solution", Cryobiology, 48: 179-189, 2004.

Opposition Appeal decision document dated Apr. 20, 2020 in EP 09793619.9.

EPO opposition document dated Aug. 24, 2020 and issued in EP Application No. 16155369.

EPO Communication re letter from the opponent, received in a corresponding EP Patent No. 3048862 (Application No. 16155369.8), dated Oct. 13, 2021.

* cited by examiner

DEVICE AND METHOD FOR CONTROLLING ENERGY

CROSS-REFERENCE TO RELATED APPLICATIONS

The present application is a divisional of U.S. patent application Ser. No. 15/391,029, filed on Dec. 27, 2016, which is a continuation of U.S. patent application Ser. No. 13/128,369, filed on Nov. 17, 2011 as a national phase application based on PCT/IL/2009/001057, having an international filing date of Nov. 10, 2009, which claims the benefit of priority from U.S. Provisional Patent Application No. 61/193,248 filed Nov. 10, 2008 and U.S. Provisional Patent Application No. 61/253,893 filed Oct. 22, 2009 and is related to PCT/IL/2009/01058 and PCT/IL/2009/01059, both of which were filed on Nov. 10, 2009, the disclosures of all of which are incorporated herein by reference in their entireties.

FIELD OF THE INVENTION

The present application, in some embodiments thereof, is concerned generally with dissipation of electromagnetic (EM) energy in a load, and more particularly but not exclusively with RF heating, for example using microwave or UHF energy for thawing, heating and/or cooking.

BACKGROUND OF THE INVENTION

Heating objects using high frequency radiation is wide spread, and comprises the commonly used domestic microwave (MW) oven, as well as commercial ovens that use MW energy, mainly in combination with other means of heating, such as steam, hot air and infrared heating elements.

Among the many problems associated with known MW ovens is a lack of uniformity in heating, which often results in hot spots and cold spots that reflect the standing wave within the cavity. Many of the attempts to improve uniformity in such devices included increasing the number of modes within the cavity (e.g. by mode stirring and/or moving the load during heating).

In some cases, where multiple frequencies were used, the devices were configured to measure the efficiency of energy transfer into the cavity at different transmitted frequencies and then to transmit energy to the load only at frequencies having a relatively high efficiency, with the intent that this should increase the efficiency of energy transfer into the load.

Heating an object changes its dissipation characteristics at different frequencies. For example, a frequency that is dissipated in the load at one rate before heating may dissipate at a different rate (higher or lower) after some heating or movement of the load took place.

SUMMARY OF THE INVENTION

According to some embodiments there is provided an apparatus and a method for irradiating a load with an irradiation spectrum of frequencies. Irradiating is performed by transmitting different amounts of energy at different frequencies. The amount of energy transmitted at each frequency is controlled by at least by varying respective durations during which corresponding frequencies are transmitted.

According to one aspect of the present embodiments, a method of irradiating a load is provided in which different amounts of energy are supplied at different frequencies by varying the respective durations during which corresponding frequencies are transmitted. Hence a frequency which from which much energy is required is transmitted for a longer amount of time and a frequency from which little energy is required is transmitted for a shorter amount of time.

Irradiating the load may be performed in a resonance cavity.

Irradiating the load may be controlled for obtaining a predetermined energy dissipation pattern in the load.

Irradiating the load may be performed at a fixed power transmission level.

Irradiating the load may be performed at a maximal power transmission level for each of the transmitted frequencies respectively. Keeping the amplifier working at a design maximum power allows for cheaper amplifiers to be used.

Irradiating the load may be controlled for limiting the maximum amount of energy provided at each of the different frequencies.

Irradiating the load may be controlled for limiting the overall amount of energy provided at the different frequencies for a period of transmission.

A period of transmission may be a transmission cycle or a duty cycle.

Irradiating the load may be controlled for limiting the overall durations during which individual frequencies are transmitted.

Irradiating the load may be controlled for maximizing the possible power at each of the transmitted frequencies.

At least two frequencies are transmitted at at least two different non-zero powers.

The method may comprise:
irradiating the load with the irradiation spectrum of frequencies;
measuring a resulting reflected and coupled spectrum (RC spectrum);
inferring current dissipation information of the load in view of the RC spectrum; and
setting the irradiation spectrum of frequencies to accord with the dissipation information wherein the setting comprises transmitting different amounts of energy at different frequencies by varying respective durations during which corresponding frequencies are transmitted.

The method may comprise:
irradiating the load with the irradiation spectrum of frequencies, such that energy is absorbed by the load;
measuring a resulting RC spectrum;
inferring current dissipation information of the load in view of the measured RC spectrum; and
modifying the irradiation spectrum of frequencies to accord with the dissipation information wherein the modifying comprises transmitting different amounts of energy at different frequencies by varying respective durations during which corresponding frequencies are transmitted.

The frequencies may be arranged in a series to form a duty cycle.

The method may comprise repetitively performing the duty cycle.

The frequencies are varied within the duty cycle.

The method may comprise switching frequencies differentially on or off over repetitions of the duty cycle to vary overall durations of irradiation at respective frequencies of irradiation of the load.

In the method, differential switching may be achieved by switching a frequency off for some of the cycles or to a lower power for some of the cycles.

According to a second aspect of the present embodiments there is provided a method for irradiating a load with an irradiation spectrum of frequencies, the load having dissipation information which varies as a function of an energy dissipation state of the load, the method comprising modifying the irradiation spectrum of frequencies to accord with the varying of the dissipation information wherein the modifying comprises varying respective durations during which corresponding frequencies are transmitted.

According to a third aspect of the present embodiments there is provided apparatus for irradiating a load, comprising:

a. an energy feed functional for transmitting energy to a cavity for resonating in the presence of the load in a plurality of frequencies; and b. a controller functional for varying respective durations during which corresponding frequencies are transmitted.

In an embodiment, the controller is configured to carry out the varying repeatedly.

In an embodiment, the controller is configured to irradiate the load with the irradiation spectrum of frequencies according to the respective durations, to measure a resulting reflected and coupled spectrum (RC spectrum), to infer current dissipation information of the load in view of the RC spectrum, and to set the irradiation spectrum of frequencies to accord with the dissipation information.

In an embodiment, the controller is configured to switch frequencies differentially on or off over repetitions of a duty cycle of the frequencies, thereby to vary overall duration of respective frequencies in the irradiating the load.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof. This refers in particular to tasks involving the control of the equipment such as a microwave, dryer and the like. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF EXEMPLARY EMBODIMENTS

Figure 1A:
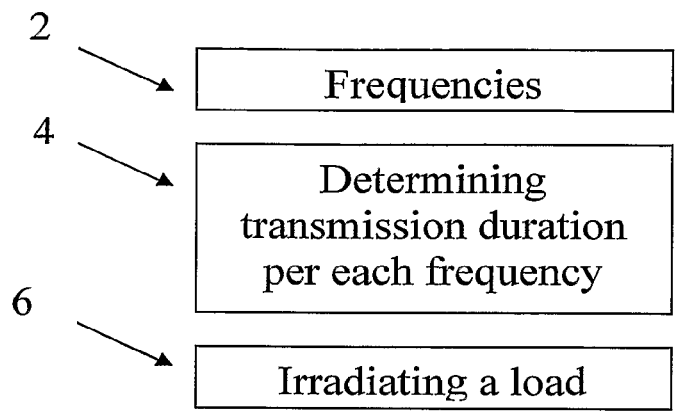
FIG. 1A is a simplified flow chart illustrating a method for of irradiating a load according to some embodiments of the present invention.

The present embodiments comprise an apparatus and a method for controlling the amount of UHF or Microwave energy that dissipates into a load at each transmitted frequency and in particular, to such a controlling through modulation of the period in which each frequency is transmitted, particularly within a duty cycle of the frequencies. The dissipating of energy may be used for example for any form of heating utilizing irradiation of energy, at times without a temperature increase, includes one or more of thawing, defrosting, warming, cooking, drying etc.

PCT patent applications No WO2007/096877 ('877) and WO2007/096878 ('878), both by Ben-Shmuel et al. (both published on Aug. 3, 2007) herein incorporated by reference, disclose methods and devices for electromagnetic heating. Some disclosed methods comprise the steps of placing an object to be heated into a cavity and feeding UHF or microwave energy into the cavity via a plurality of feeds and at a plurality of frequencies.

PCT patent application No WO2008/102,360 ('360) by Ben Shmuel et al, Published on Aug. 28, 2008, herein incorporated by reference, discloses, inter alia, a method for drying an object comprising applying broadband RF energy to an object in a cavity, in a controlled manner which keeps the object within a desired temporal temperature schedule and within a desired spatial profile; and terminating the drying when it is at least estimated that a desired drying level is achieved.

PCT patent application No WO2008/102,334 ('233) by Ben Shmuel et al, Published on Aug. 28, 2008, herein incorporated by reference, discloses, inter alia, a method for freezing a body or a portion of a body. The method comprises exposing at least a part of the body to a coolant having a temperature below the freezing point of the body, and at the same time operating an electromagnetic heater, as to maintain the at least part of the body at a temperature above its freezing point; and reducing the electromagnetic heating to allow the at least a part of the body to freeze. The electromagnetic heater comprises a resonator, and the heated part of the body is heated inside the resonator.

The aforementioned methods of '877, '878 and '233 take into account the dissipation ratio at each transmitted frequency and the maximal amount of power that may be transmitted at that frequency. The methods aim at times to deduce the amount of energy that is to be transmitted at each frequency such that only a desired amount of energy is dissipated.

The aforementioned methods of '877, '878 and '233 further disclose the option of transmitting power only (or primarily) in bands that primarily dissipate in the load. Such transmission may be used, for example, to avoid or significantly reduce dissipation into surface currents or between feeds, for example antennas including multiple feeds or antennas. The transmission can be performed, for example, such that the power dissipated in the object is substantially constant for all transmitted frequencies (which may be termed a homogeneous energy dissipation pattern in the load). Such a transmission allows an essentially equal dissipation of energy per frequency in the load, regardless of the load's composition and/or geometry, while the power fed and efficiency of energy transfer may be different for different frequencies.

According to some embodiments of the present invention, a method is provided for irradiating a load with a spectrum of frequencies, measuring a resulting reflected and coupled spectrum ("RC spectrum") spectrum, inferring from the RC spectrum the spectral dissipation of the load as it is modified over the course of the irradiation, and modifying the irradiation spectrum in response to the changing dissipation spectrum. "Spectral dissipation" or "dissipation information" of a load may be taken to mean the dissipation ratios of a plurality of transmitted frequencies in the load.

Alternatively or additionally, modifying the irradiation is performed by dynamically adjusting one or more parameters for controlling the amount of energy that dissipates into a load at each transmitted frequency in a duty cycle. The adjustment is based on spectral information retrieved from the load. Spectral information may comprise and/or be derived from one or more of the RC spectrum the full S parameters of the device, the Spectral Dissipation of the load, the dissipation ratios of transmitted frequencies in the load, the Q factor associated with dissipation peaks, and/or the maximal power that may be transmitted into the cavity at each such frequency. Such parameters for controlling the heating may be or include the time allotted per each frequency and/or the power assigned for each frequency and the like.

According to some embodiments of the present invention the transmittal time for each frequency is adjusted such that a desired energy is dissipated into the load at any given frequency. In such a protocol, the time of transmission may be used to compensate for cases having a relatively low energy dissipation ratio and/or low maximal power input by assigning more time for such frequencies (e.g. if a high relative energy transmission is desired for such frequencies in a given cycle). The desired energy that is dissipated in a load at a given frequency is such that may accord with a desired dissipation pattern in the load. Accordingly, the desired energy may be for example an absolute value per frequency or a relative value (as compared to another transmitted frequency) or a combination of both. It may also be related to the total amount of energy that should be dissipated in a plurality of frequencies and the pattern (relative dissipation ratio) between them. A dissipation pattern in the load means the relative and/or absolute amount of energy that needs to be dissipated in a load that is exposed to irradiation at each frequency or a plurality of frequencies. The pattern may be frequency related (e.g. dissipate a given or relative amount by a frequency) and/or site related (e.g. dissipate a given or relative amount into a site in the load) or another parameter or characteristic of the spectral information (possibly across the whole working band). For example—a dissipation pattern may be homogeneous (essentially the same amount of energy to be dissipated by a plurality of frequencies and/or at a plurality of sites). For example, for homogeneous energy dissipation all, or a significant majority (e.g. 51% or more, 60% or more, 80% or more, or even 95% or more), of the dissipated energy values for each frequency in a heating cycle must be similar (e.g. maximum difference is lower than 40%, 20%, 10%, 5% of the mean value). In other patterns, a different relation may exist. For example, in some protocols that may be used for thawing, a relatively small amount of energy (if any) is dissipated for frequencies having a high dissipation ratio, while a relatively large amount of energy is dissipated for frequencies having a low dissipation ratio. An energy dissipation pattern may comprise one or more of (a) homogeneous energy dissipation in the load, (b) controlled, non-homogeneous energy dissipation in the load or (c) a combination thereof. The dissipation pattern may be chosen per irradiation cycle or it may be chosen for a plurality of cycles or even the whole process.

A time adjusted method may enable a reduction in the overall process time in comparison to adjusting only the power input at each frequency (i.e. where the transmission time per frequency is fixed) since a higher power level (at least in some frequencies) becomes possible. Optionally, highest power level (as a function of frequency) is transmitted at all frequencies, maximizing (for given spectral situation and power source) the energy dissipation ratio, thus minimizing the time. The controlling of the time may be performed one or more times during heating, for example, before each duty cycle, and/or before and/or after a plurality of duty cycles, and may be based on spectral information or dissipation information retrieved from the cavity and/or the load. The control may encompass for example the control of the device over the different frequencies, for example to ensure that each frequency is transmitted at a power and duration as necessary, but at times control may also encompass the change of transmission patterns for example between cycles, and at times also respective calculations and/or decision making processes.

Additionally, or alternatively, the maximal possible power at each transmitted frequency is transmitted for that frequency, while controlling the time period of transmission for that frequency. Such a transmission results in dissipating a desired amount of energy at the given frequency into the load. Such transmission results in an increase or even maximization of the dissipated power (or rate of energy transfer to the load) while achieving a desired energy dissipation pattern. Additionally or alternatively a reduction or even minimization of the time needed for dissipating any given amount of energy using a given energy dissipation pattern is achieved. Surprisingly, energy transfer at the maximal possible power at carefully chosen frequencies over the spectrum does not cause damage to the object, although the transfer of energy at one frequency may affect the load's dissipation of a consequently transmitted frequency.

According to some embodiments of the present invention, the time allotted for transmission of each frequency is fixed for all transmitted frequencies within a duty cycle while the frequencies that appear in each cycle are dynamically selected, so that summation over many cycles provides the wanted dissipation pattern, according to spectral information and/or dissipation information retrieved from the cavity and/or load. The embodiment is explained in greater detail in FIG. 5.

According to some embodiments of the present invention, the time allotted for transmission of each frequency is fixed for all transmitted frequencies within a duty cycle while the power is dynamically adjusted over a series of duty cycles so that a desired heating pattern is achieved over the series of cycles (a preset group of cycles). In such cases, it is possible to transmit each frequency repeated cycle within the group of cycles, until the desired energy is dissipated by that frequency. The transmission power for each frequency may be maximal for at least a portion of the cycles within the group of cycles, such that a desired amount of energy is dissipated in total by the frequency. At times, this means that the frequency is transmitted at maximal power during some of the cycles within a group and at a lower power (or even not at all) for one or more cycles within a group. The controlling of the power may be based on spectral information and/or dissipation information retrieved from the cavity and/or load.

The principles and operation of an apparatus and method according to the present invention may be better understood with reference to the drawings and accompanying description. Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

FIG. 1A is a simplified diagram illustrating a first embodiment according to the present invention of a method for irradiating a load over a sequence of frequencies. According to some embodiments of the present invention, there is provided a method in which the transmittal time for each frequency in a sequence of transmitted frequencies is adjusted such that a desired energy is dissipated into the object at that given frequency. The amount of time for transmission of each frequency may be deduced (and accordingly controlled) each time the spectral information and/or dissipation information is updated or at each duty cycle or for several duty cycles or even during a duty cycle, based on spectral information and/or dissipation information. Reference is now made to box 2, in which frequencies to be transmitted to a load are provided. The frequencies are at times predetermined although more generally they may be selected dynamically during the irradiation process (e.g. based on spectral information and/or dissipation information). In box 4 the transmission duration per each selected frequency is determined. The transmittal time for each frequency is adjusted such that a desired energy (absolute or relative) is dissipated into the object at any given frequency in a given cycle (or plurality of cycles). In box 6, the load is irradiated such that each frequency from the selected frequencies is transmitted for the duration that was set in box 2.

Figure 1B:
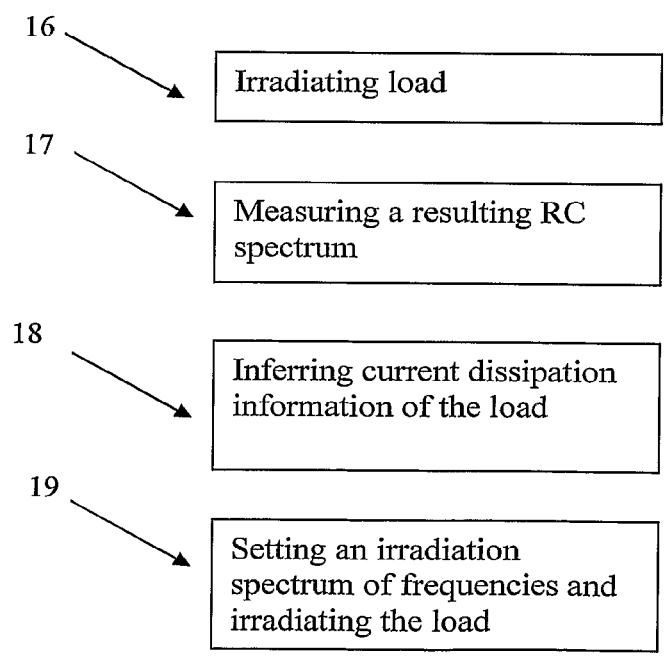
FIG. 1B is a simplified flow chart illustrating a method according to some embodiments of the present invention for providing controlled energy irradiation to a load whose dissipation information varies depending on the energy state of the load.

Reference is now made to FIG. 1B which is a simplified flow chart illustrating a method for providing controlled energy irradiation to a load according some embodiments of the present invention, and illustrating how feedback from the load and/or cavity can be used for setting of the transmission times for the various frequencies. Normally a load has an energy dissipation information which is not static but rather varies depending on a current state of the load. In box 16, the cavity is irradiated with the irradiation spectrum of frequencies. In box 17, a resulting RC spectrum is measured. The steps shown in boxes 16 and 17 may be performed such that the measurement itself would not transmit a significant amount of energy to the load. This may be done for example at a low power that would have little or no heating effect, but would suffice for obtaining the reflectance spectrum. Alternatively the spectral information (or dissipation information) may be measured by transmitting at high power, but for a very short time (e.g. 1, 10,100 or even 1000 msec). The reflectance spectrum indicates, inter alia, for each transmitted frequency and for the whole transmitted spectrum the dissipation information. In box 18 a current dissipation information of the load is inferred.

In box 19, the irradiation spectrum of frequencies is set to accord with the dissipation information inferred in previous steps. This setting may include setting the selection of which frequencies to transmit and/or setting a transmission power and/or time to accord with the dissipation information, and may include the necessary calculation steps needed to set such parameters based on the dissipation information. When all frequencies are transmitted for the duration that is set for them, one duty cycle is finished and a new cycle may commence. Such a duty cycle may be deemed to include a plurality of transmission cycles.

Thereafter, the irradiating in box 19 may be stopped and the process may be repeated (boxes 16-19), thereby dynamically resetting the transmission times to accord with the changes in the RC spectrum (or dissipation spectrum) during heating. Thus the load may be irradiated such that a wanted dissipation pattern is achieved. Relative amounts of energy transmitted at different frequencies may be adjusted in response to the respective dissipation ratios at each frequency in the band. Alternatively the relative amounts of energy transmitted may be adjusted in response to a function or derivation of the dissipation ratios at all the frequencies in the band, thereby affecting the energy distribution pattern in the load.

Figure 1C:
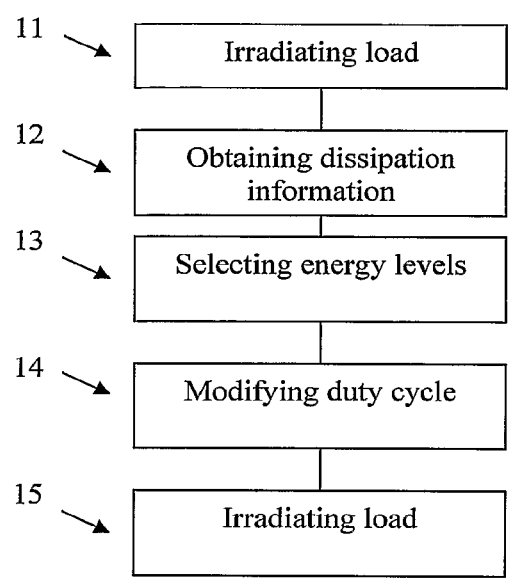
FIG. 1C is a simplified flow chart of a method of controlling the amount of energy that dissipates into a load at each transmitted frequency through modulation of the period in which each frequency is transmitted accordance with some embodiments of the invention.

Reference is now made to FIG. 1C, which is a simplified flow chart of a method of controlling the amount of energy that dissipates into a load at each transmitted frequency through modulation of the period in which each frequency is transmitted. In box 11, the load is irradiated by UHF or Microwave radiation, using a sequence of frequencies in a duty cycle. This may be done at relatively low power and/or at a high power for a very short transmission time such that information is obtained with very little energy transfer (hence little or no effect on the dissipation information). In box 12, dissipation information is obtained from the load. In box 13, energy levels are selected for each frequency based desired energy transmission pattern. This may be based for example on respective dissipation levels and overall desired energy dissipation for the load. In box 14, the duty cycle is set at least by selecting respective durations within the duty cycle during which corresponding frequencies are transmitted. These durations are selected such that transmission is effected at a given power. Typically the given power is the maximal possible power at that frequency, and in view of the dissipation ratio for that frequency, the set amount of energy is transmitted. In box 15, the load is irradiated according to the duty cycle. This may be followed again by box 11 of a new round of duty cycle modification. The initial energy dissipation information (or in fact the whole dissipation pattern) may be obtained from pre-defined energy dissipation information, say expected dissipation information for an egg, or for heating water (e.g. based on previous operation of the device or a like device with a similar load). The duty cycle is modified by varying at least the respective durations within the duty cycle during which corresponding frequencies are transmitted. The duty cycle may comprise the frequencies that are used for irradiating the load and the power that is transmitted at corresponding frequencies. The energy per frequency may be limited within the cycles. The limiting may be based on a maximum cumulative time power combination for each frequency allowed for performing the cycles or on a maximum energy per frequency allowed.

As has been noted elsewhere herein, not all energy transmitted is actually dissipated (or absorbed) by the load. The proportion of energy transmitted that is absorbed by the load normally varies for different frequencies and for different loads. Excess transmitted energy may be reflected back to the feed or coupled to another feed if such is present.

Figure 2:
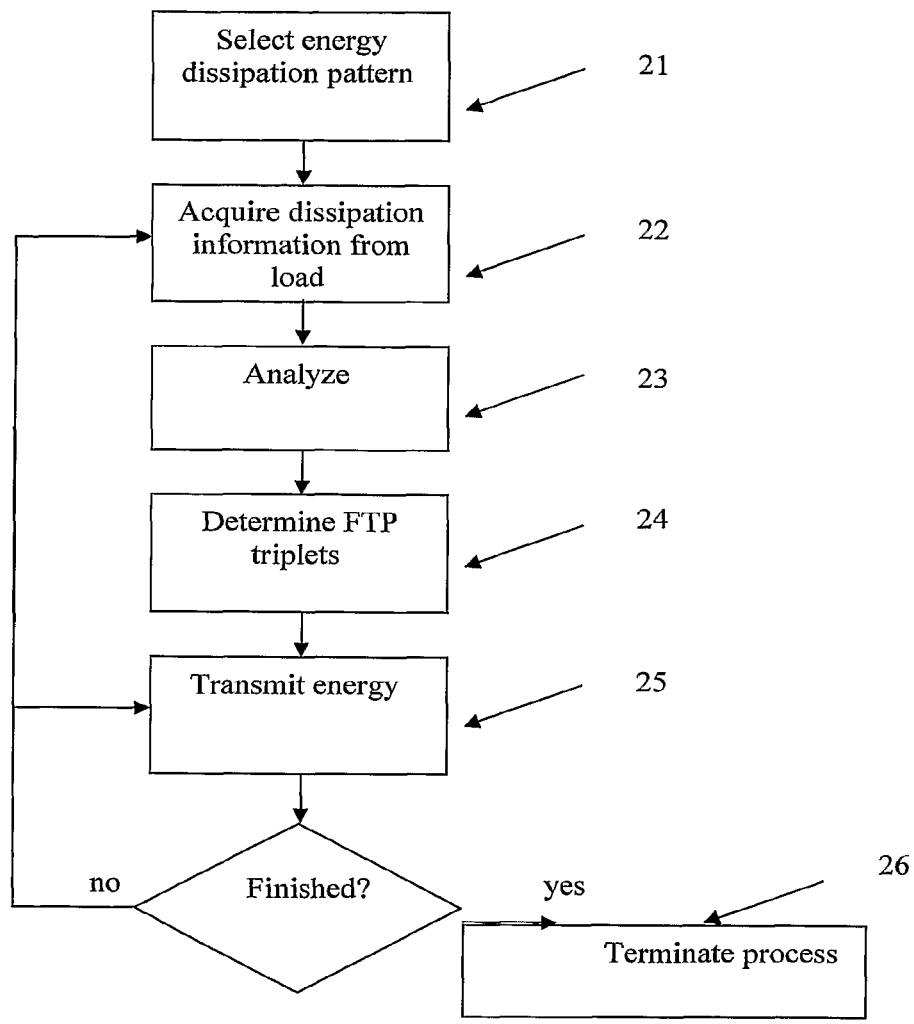
FIG. 2 is an exemplary flow chart of controlling the transfer of energy by irradiation in a plurality of frequencies.

FIG. 2 is an exemplary flow chart depicting control over the amount of energy that is transmitted. In box 21, an energy dissipation pattern is optionally selected. In box 22, dissipation information is acquired from the load (e.g. by transmitting a low energy frequency sweep as described above). In box 23, the dissipation information is analyzed. In box 24, per each frequency that is to be transmitted, frequency/time/power (FTP) triplets are selected to perform the selected profile. A method for selecting the triplets is explained in greater detail hereinafter. One or more of the FTP triplets may be fixed for all or a plurality of frequencies. In box 25 energy is transmitted to the load according to the FTP triplets. The process described in boxes 21-25 may be repeated with or without new information acquisition and analysis steps. Box 26 describes the termination, which may be automatic. Automatic termination may be after a set amount of energy was dissipated or after a given time is expired, or based on sensed input which may be humidity/temperature/volume/phase change and the like. The termination can also be manual.

The amount of power that is desired to be dissipated in the load at a given frequency for a given dissipation ratio for a unit time is defined hereinafter as dpl(f). Power means the energy dissipated per unit time. Supplying different amounts of energy for different frequencies may be carried out for example by using different peak powers, different duty cycles and/or transmitting at different rates. For example power may be supplied at fixed amplitudes, but at different rate and/or delays between pulses for different frequencies.

In power adjusted heating, the time allotted for transmission of each frequency is fixed for all transmitted frequencies within a cycle, but the power may vary between frequencies. When it is desired to have a homogeneous dissipation of power at all frequencies (or a particular range of frequencies), dpl(f) is selected to be the same for all transmitted frequencies. In such cases, a different power is transmitted at different frequencies having different dissipation ratios to affect an essentially homogeneous amount of energy dissipated at the respective frequencies.

The maximal amount of power that may be dissipated in a load in a unit of time (using a given power source—e.g. RF power amplifier) is defined as ep(f), which is a function of the dissipation ratio at that frequency (dr(f)) and the maximum power available from the power source at that frequency ($P_{max}$). Since (in power adjusted heating) the time allotted for transmission of each frequency is fixed for all transmitted frequencies, for some frequencies it might not be possible to dissipate a high desired amount of energy within the time slot (i.e. where ep(f)<dpl(f)). Choosing a low dpl(f) may increase the number of frequencies that can have the desired amount of power (dpl) dissipated in them (ep(f)≥dpl(f)), and consequently the desired amount of energy dissipates in more portions of the load. However, this would be at the expense of the speed of energy dissipation. Choosing a higher dpl may increase the speed of heating since more energy is dissipated within a given time slot, but also causes a higher deviation of the actual energy dissipation from the selected energy dissipation pattern because more frequencies have ep(f)<dpl and hence may receive only the maximum available energy, which, for those frequencies in that circumstance, is lower than dpl. It is noted, that by modifying a characteristic of the cavity (e.g. by moving a field adjusting element and/or moving the load), the spectral information and/or dissipation information may be modified such that, for example, a given dpl(f) would be transmittable at a greater number of frequencies, thereby allowing an increase of the heating rate at a given level of uniformity.

In time adjusted heating, the time allotted for transmission of each frequency may be varied between transmitted frequencies within a cycle and optionally the transmission power may also vary between frequencies. When it is desired to have a homogeneous, or essentially homogeneous, dissipation of power at all or some frequencies, dpl(f) is selected to be the same for all transmitted frequencies. By using this method a different time may be used to transmit at different frequencies, at the same and/or different transmission powers, but due to different dissipation ratios, essentially the same amount of power is dissipated in the load.

Since in time adjusted heating the time allotted for transmission of each frequency may vary, say in order to compensate for differences in ep(f), more frequencies may be useful at a given dpl(f) than in power adjusted heating. In fact, in time adjusted heating the dissipation patterns and time are virtually unlimited when compared to those achievable under similar conditions with power adjusted heating. Still other limitations may be imposed, as detailed for example below, that might prevent the use of frequencies having too high or too low dissipation ratios and/or ep(f).

Therefore, modifying a characteristic of the cavity, for example by moving a field adjusting element and/or moving the load, in a time adjusted protocol may also be used to modify the number (or proportion) of frequencies which may be used to affect a desired dissipation pattern.

According to some embodiments a desired total amount of energy to be dissipated in the load in any given transmission cycle is set in advance. A transmission cycle, termed also as duty cycle, is a set of transmissions comprising all frequencies used in a working band, transmitted at one time or in a sequence, according to a desired energy dissipation pattern. In a cycle, a frequency may be transmitted once, or more than once as with the above mentioned group of cycles, to affect the energy dissipation pattern. A cycle, for example, can be implemented as a frequency sweep, where each frequency is transmitted once, and/or as a pulse where a plurality of frequencies are transmitted at the same time or using and/or any other method known in the art. A cycle may be the total transmissions of energy between resetting events of the transmission spectrum parameters. A single heating protocol may be performed as a single transmission cycle (especially when the desired energy dissipation is small) or as a plurality of transmission cycles.

According to some embodiments for time adjusted heating, a bottom transmitted power limit may be selected, for example to prevent an undue elongation of the cycle by the need to transmit at relatively low ep(f), for example 50% or less, 20% or less, 10% or less or even 3% or less of the maximum ep(f) value, or when ep(f) is below a pre-set absolute value. This power limitation is termed herein as bpl. tpl(f)) denotes the power that may be transmitted by the device at a given frequency to dissipate dpl. Hence, tpl(f) is a function of dpl, the maximum amount of power that can be transmitted by the device at a given frequency and the dissipation ratio (dr(f)) at that frequency). Where tpl(f) is lower, the time needed in order to have dpl(f) dissipated is longer than if tpl(f) was higher (for the same dpl(f)). Where tpl(f)<bpl the heating protocol may hence be adjusted to limit the amount of time spent at such frequencies. For example—frequencies having tpl(f) that is below bpl may be ignored, in other words not transmitted at all, or alternatively, they may be transmitted for a limited period of time. Thus for example the period of heating for ep(f)=bpl.

According to some embodiments, the amount of maximal transmitted power is limited, for example in order to prevent damage to the device. The limitation is performed by setting a maximum limit on tpl(f). This limitation may have greater importance at low dissipation ratio frequencies where the portion of transmitted power that is not dissipated in the load is large. The effect of this limitation may be reduced by adding protective measures to different parts of the device, such as cooling means to the reflected power load. The controller may be configured to prevent the power that is dissipated in the reflected power load from exceeding a predefined upper limit. Such a configuration may be achieved by calculating the return and coupled energy or by measuring temperature or any other means known in the art.

According to some embodiments, an upper limit may be imposed on the power level that is allowed to be transmitted into the cavity for any reason, including for example prevention of damage to the device and prevention of excessive emission from the device. Such a limit is termed utpl. The transmission (tpl'(f)) according to such limitation is depicted in Table 1.

TABLE 1

$$tpl'(f) = \begin{cases} utpl & tpl(f) > utpl \\ tpl(f) & else \end{cases}$$

According to some embodiments, an upper limit may be imposed on the power level that is allowed to be dissipated into the load for prevention of damage to the load and/or the device and/or prevention of excessive emission from the device or for any other reason. The upper limit in such a case is termed herein as upl. The limitation is defined in Table 2, wherein gl(f) denotes the amount of power to be dissipated into the load at each frequency regardless of upl, and gl'(f) denotes the amount of power to be dissipated into the load at each frequency when taking upl into account.

TABLE 2

$$gl'(f) = \begin{cases} upl & gl(f) > upl \\ gl(f) & else \end{cases}$$

Finally, at times two or more of upl, utpl and bpl may be used.

Exemplary Method for Selecting FTPs:

dr(f), being the dissipation ratio at a given frequency, has potential values between 0 and 1, and may be computed as shown in Equation 1, based on the measured power and using measured S-parameters, as known in the art.

$$dr_j(f) = \frac{P^j_{incident,watt}(f) - \sum_i P^i_{returned,watt}(f)}{P^j_{incident,watt}(f)} = 1 - \frac{\sum_i P^i_{returned,watt}(f)}{P^j_{incident,watt}(f)}$$

The maximum power that can be dissipated in the load at each frequency (depicted as $ep_j(f)$) is calculated as follows, given that $P_{maximum,j,watt}$ is a maximum power available from the amplifier at each frequency.

$$ep_j(f) = dr_j(f) P_{maximum,j,watt}(f)$$

In any given dissipation cycle, gl(f) denotes the power to be dissipated into the load at each frequency. dpl(f) is defined as the amount of power that is desired to be dissipated in the load at a given frequency and the dissipation is therefore as described in table 3.

TABLE 3

$$gl(f) = \begin{cases} dpl(f) & dpl(f) \le ep(f) \\ ep(f) & else \end{cases}$$

Note: gl(f) (and ep(f) and dpl(f)) is a powers that are to be dissipated into the load; the power to be transmitted by the device at each frequency (tpl(f)) is a function of gl(f) and dr(f) as described in table 4.

TABLE 4

$$tpl(f) = \frac{gl(f)}{dr(f)}$$

In cases where a bpl is applied such that transmitted is prevented for tpl(f) values lower than bpl, the actual transmission (ttl'(f)) is therefore as described in table 5.

TABLE 5

$$tpl'(f) = \begin{cases} 0 & tpl(f) < bpl \\ tpl(f) & else \end{cases}$$

Transmission Time Calculation:

In some exemplary embodiments of the invention, a basic time step is chosen (hereinafter termed bts (e.g. 10 nsec)). The basic time step is normally a feature of the controller that controls the time for transmission of each frequency and defines the maximal resolution in time units between transmitted frequencies. ttd(f) is a numerical value, which defines the time needed to transmit tpl(f), as measured in bts units. ttd(f) may be calculated as follows:

$$ttd(f) = \frac{tpl'(f)}{ep(f)/dr}$$

Accordingly, the minimal transmission time may be calculated as a function of ttd(f) and bts. At times, it may be desired to impose a cycle time that would transmit at least a meaningful amount of energy, or that the cycle time would not be very short for any other reason. Therefore, a time stretch constant (tsc) may be introduced to increase the cycle time above the aforementioned minimum, thereby calculating the actual transmission time for each frequency (att(f)) as follows:

$$att(f) = ttd(f) * bts * tsc$$

tsc may be used to increase/decrease a cycle duration. This may be a fixed value for a device or different fixed values may be set for different operation protocols of the device or based on characteristics of the load, or adjusted from time to time during an operation cycle (e.g. based on limitations for a total amount of energy is transmitted per cycle), etc. In fact, at times, increasing the value of tsc may be used in order to transmit low dpl(f) values, which may increase the overall duration of the energy transmission process, but might provide more exactly the desired dissipation pattern.

It should be noted, that a given total amount of transmission time (att(f)) is assigned to each frequency so that this period is not necessarily transmitted continuously. Rather, a transmission cycle may be broken down to a plurality of cycles, wherein some or all of the transmitted frequencies are transmitted for periods smaller than att(f) whilst the total transmission time for each frequency is maintained as att(f).

Demonstration of Time Reduction:

The exemplary description is based on two transmitted frequencies $f_1$ and $f_2$ and a maximum transmittal power of a device $P_{maximum} = P_1 > P_2$. According to a selected power transfer protocol based on adjusting the power transmitted, $P_1$ is transmitted at $f_1$ and $P_2$ at $f_2$, each for a fixed period of time t. In such case, the total time used to transmit $E_1$ and $E_2$ is 2t.

$$E_1 = P_1 t$$

$$E_2 = P_2 t$$

$$t_{total} = 2t$$

According to a selected power transfer protocol based on adjusting the time during which energy is transmitted, $P_{maximum}$ is transmitted at both $f_1$ and $f_2$. In such case, the total time used to transmit $E_1$ and $E_2$ is calculated as follows:

$$E_1 = P_{maximum} t_1 = P_1 t$$

$$E_2 = P_{maximum} t_2 = P_2 t$$

Since $P_{maximum} = P_1$, $t_1$ must be equal to t. But since $P_{maximum} > P_2$, $t_2$ must be smaller than t:

$$t_2 = t - \delta$$

$$t_{total} = t_1 + t_2 = t + (t-\delta) = 2t - \delta < 2t$$

Figure 3:
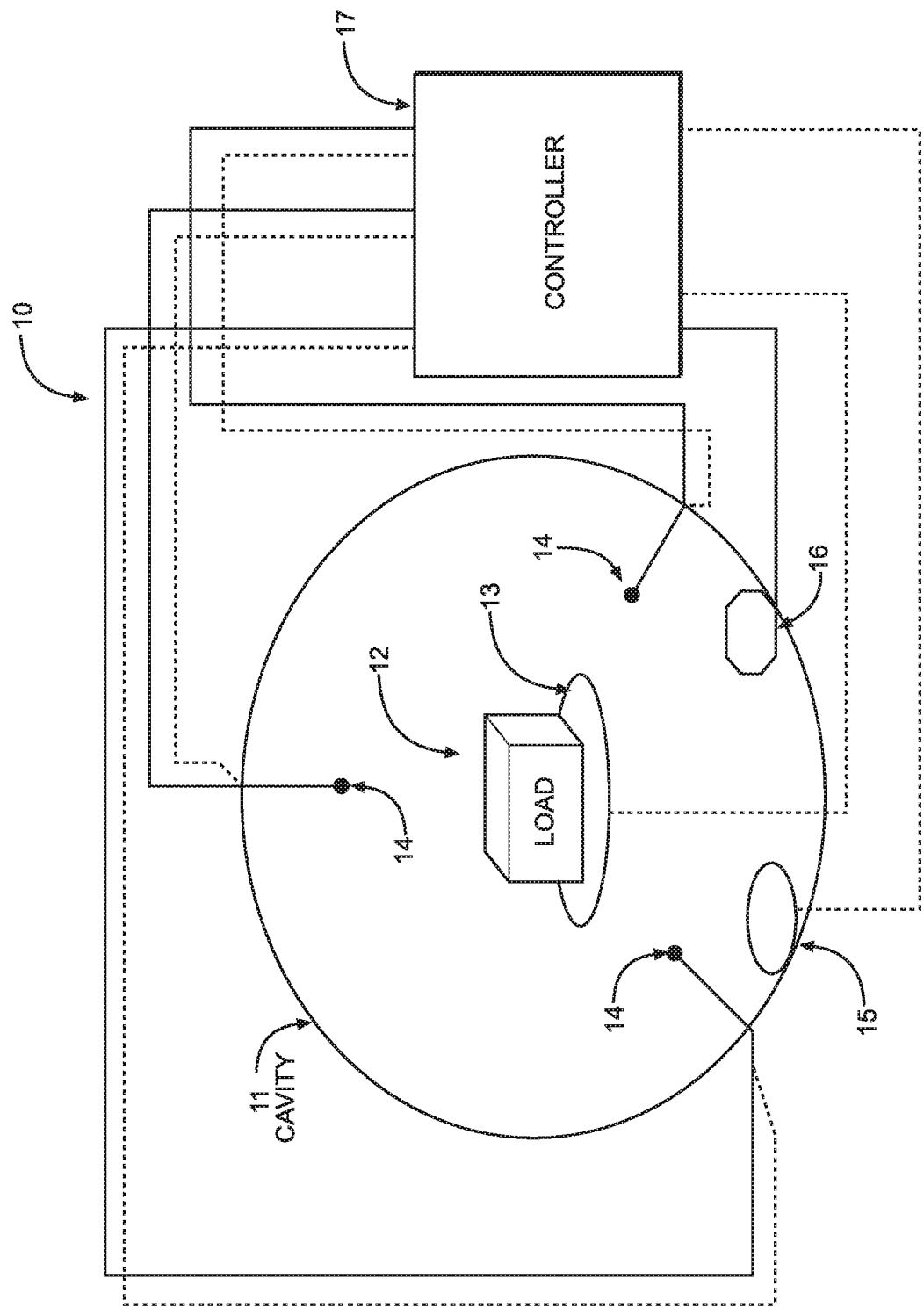
FIG. 3 schematically depicts a device in accordance with an exemplary embodiment of the present invention.

FIG. 3 schematically depicts a device 10 according to an embodiment of the present invention. Device 10, as shown, comprises a cavity 11. Cavity 11 as shown is a cylindrical cavity made of a conductor, for example a metal such as aluminum. However, it should be understood that the general methodology of the invention is not limited to any particular resonator cavity shape. Cavity 11, or any other cavity made of a conductor, operates as a resonator for electromagnetic waves having frequencies that are above a cutoff frequency (e.g. 500 MHz) which may depend, among other things, on the geometry of the cavity. Methods of determining a cutoff frequency based on geometry are well known in the art, and may be used.

A load 12 is placed is the cavity which is a Faraday cage, optionally on a supporting member 13 (e.g. a conventional microwave oven plate). In an exemplary embodiment of the invention, cavity 11 comprises one or more feeds 14 which may be used for transmitting energy into the cavity for resonating in the presence of the load in a sequence of frequencies. The energy is transmitted using any method and means known in that art, including, for example, use of a solid state amplifier. One or more, and at times all, of the feeds 14 can also be used one or more times during operation for obtaining the spectral information of the cavity, and/or dissipation information of the load, within a given band of RF frequencies to determine the spectral information of the cavity, e.g., dissipation information of the load, as a function of frequency in the working band. This information is collected and processed by controller 17, as will be detailed below.

In an exemplary embodiment of the invention, cavity 11 also comprises one or more sensors 15. These sensors may provide additional information to controller 17, including, for example, temperature, detected by one or more IR sensors, optic fibers or electrical sensors, humidity, weight, etc. Another option is use of one or more internal sensors embedded in or attached to the load (e.g. an optic fiber or a TTT as disclosed in WO07/096878).

Alternatively or additionally, cavity 11 may comprise one or more field adjusting elements (FAE) 16. An FAE is any element within the cavity that may affect its spectral information (or dissipation information or RC spectrum) or the information derivable therefrom. Accordingly, an FAE 16 may be for example, any load within cavity 11, including one or more metal components within the cavity, feed 14, supporting member 13 and even load 12. The position, orientation, shape and/or temperature of FAE 16 are optionally controlled by controller 17. In some embodiments of the invention, controller 17 is configured to perform several consecutive sweeps. Each sweep is performed with a different FAE property (e.g., changing the position or orientation of one or more FAE) such that a different spectral information (e.g. dissipation information or RC spectrum) may be deduced. Controller 17 may then select the FAE property based on the obtained spectral information. Such sweeps may be performed before transmitting RF energy into the cavity, and the sweep may be performed several times during the operation of device 10 in order to adjust the transmitted powers and frequencies (and at times also the FAE property) to changes that occur in the cavity during operation.

At times, the FAEs are controlled and/or the load is rotated or moved, so that more useful spectral information (e.g. dissipation information or RC spectrum) may be acquired for selective irradiation and/or for setting of radiation parameters such as dpl (and any of other radiation parameters defined herein), for example as described below. Optionally or alternatively, the load and/or FAEs are periodically manipulated and/or based on a quality or other property of the acquired spectral information. Optionally, the settings are selected which allow a highest dpl(f) to be selected.

An exemplary transfer of information to the controller is depicted by dotted lines. Plain lines depict examples of the control exerted by controller 17 (e.g., the power and frequencies to be transmitted by an feed 14 and/or dictating the property of FAE 16). The information/control may be transmitted by any means known in the art, including wired and wireless communication.

Controller 17 may also be used for regulating the energy per frequency by varying respective durations during which corresponding frequencies are transmitted.

Figure 4A:
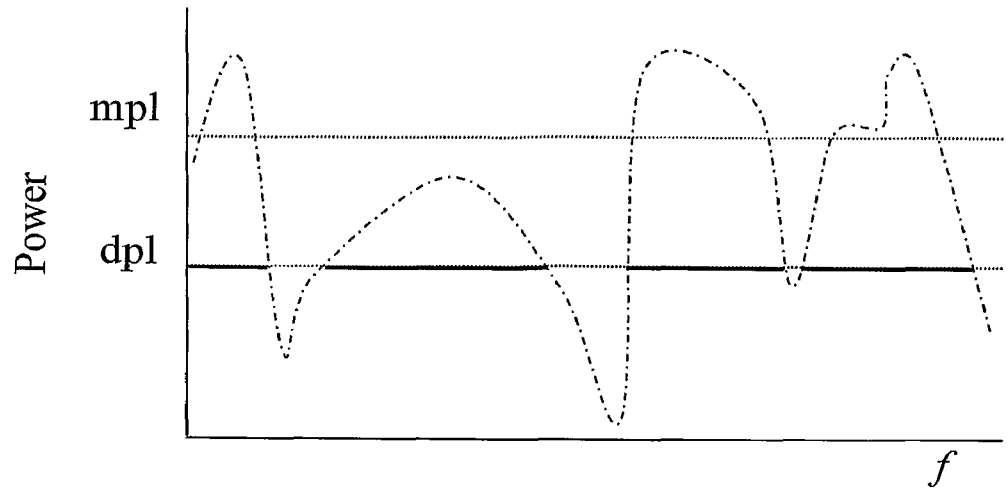
FIGS. 4A and 4B depict schematic graphs of power versus frequency for an exemplary decision functions.
Figure 4B:
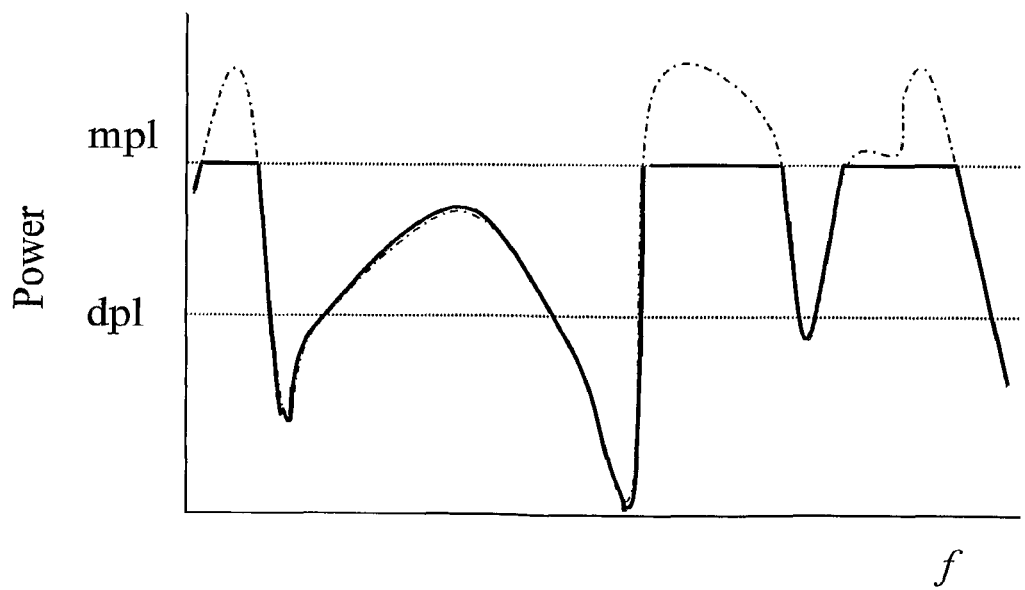

FIGS. 4a and 4b depict exemplary graphs representing two examples of adjusting parameters before performing a duty cycle, in order to dissipate the same amount of energy at a plurality of frequencies. FIG. 4A represents a power-adjusted method while FIG. 4B represents a time-adjusted method. In this example, the t-adjusted method is one wherein the amount of time allotted per each frequency before is adjusted performing a duty cycle while maintaining a fixed amount of power per each transmitted frequency, and the time adjusted method is one wherein the amount of power per each frequency is adjusted before performing duty cycle while maintaining the time allotted per each frequency fixed.

The dashed lines in FIG. 4A and in FIG. 4B respectively represent the maximum power that can be dissipated in the load at each frequency (ep(f)). As shown in the figures, the maximum dissipated power (ep(f)) is the same in both figures. In both figures, a limiting factor termed mpl is introduced, denoting a maximal power level above which dissipation is prevented. In FIG. 4A, the time for transmission of each frequency is fixed, and the power chosen to be dissipated at each frequency is the same, and is selected to be dpl (e.g. based on a tradeoff between heating at high power and using a large number of frequencies having an ep(f) that is at least equal to dpl). As can be seen, some frequencies having ep(f)<dpl are not transmitted, and all but a few frequencies are transmitted below their ep(f). In FIG. 4B which represents a time-adjusted method, most of the frequencies are transmitted at respective ep(f), except those having ep(f)>mpl. The line denoting dpl in FIG. 4B shows the same dpl line appearing in FIG. 4A and is provided merely for comparison between the two graphs.

Figure 5:
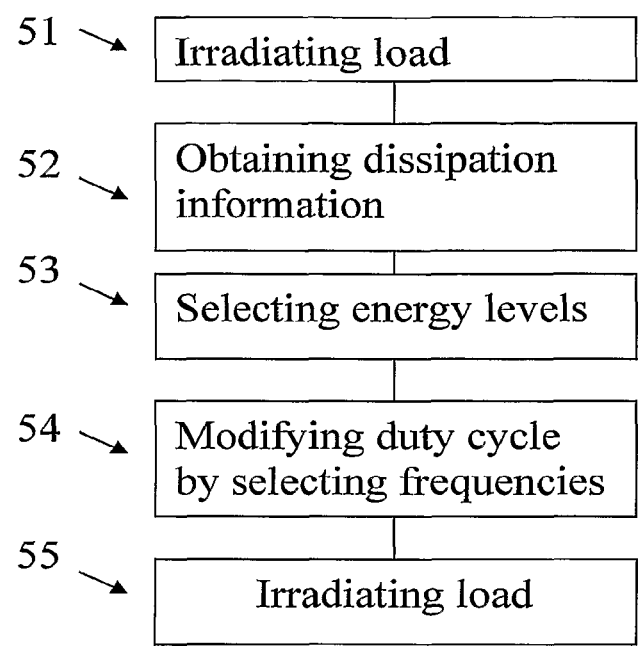
FIG. 5 is an exemplary scenario of controlling a duty cycle for irradiating a load, according to embodiments of the present invention.

FIG. 5 is an exemplary scenario of selecting the frequencies that appear in each cycle, according to embodiments of the present invention. In this example the time allotted per each frequency is fixed in each duty cycle and the adjustment is achieved by determining which frequency appears in which duty cycle. Such an adjustment takes into consideration the desired percentage of energy transmitted at each frequency. A certain frequency may appear in all duty cycles to provide a hundred percent of its maximum energy while another frequency may appear in one out of a plurality of duty cycles (e.g. 1 in 3) to achieve a portion (in the aforementioned example a third) of its maximum energy output. Increased resolution may be achieved if selecting not to transmit a frequency or transmitting but below its full power for some of the cycles. In box 11, the load is irradiated by UHF or microwave radiation, using a sequence of frequencies in a duty cycle. In box 12, dissipation information is obtained from the load. In box 13, energy levels are selected for each frequency that participates in the current duty cycle based on respective dissipation levels and desired energy dissipation for the load. In box 14, the duty cycle is modified by varying the frequencies that take place in the duty cycle. In box 15, the load is irradiated according to the modified duty cycle, which may then be followed by box 11 of a new round of duty cycle modification. The desired energy dissipation is obtained from pre-selected energy dissipation information.

In another example, power is provided as multi-frequency pulses, with each pulse including power in a plurality of frequencies; the frequencies in each pulse and/or amplitude of the power for a frequency in a pulse may be selected to apply a desired average power.

Exemplary Application

In the following examples the device used was a 900 Watts device with a working band at 800-1000 MHz, constructed and operated essentially according to an embodiment of above-mentioned WO07/096878 ('878);

1. Warming Algorithm

Tap water (500 gr) was heated by a protocol suitable for providing essentially the same amount of energy to all portions of the load. A total of 60 kJ was transmitted to the load (water and the bowl in which the water was held) in each experiment.

In a first warming experiment different amounts of energy were transmitted at different frequencies by transmitting each frequency for the same fixed period of time, while varying the period of transmission, according to an embodiment of '878. In this example the water heated from ca. 22° C. to ca. 38° C. (an increase of 16° C.) in 2:25 minutes.

In a second warming experiment different amounts of energy were transmitted at different frequencies by transmitting each frequency at the maximum available power and varying the time of transmission, according to an embodiment of the present invention. The water was heated from ca. 21° C. to ca. 38° C. (an increase of 17° C.) in 1:58 minutes (ca. 80% of the time needed for the first warming experiment).

The difference in temperature increase may be attributed for example to inaccuracy of the thermometer and/or to slight differences between the bowls which may have lead to different absorbance of RF energy.

2. Thawing Algorithm

Frozen chicken breasts (boneless and skinless; bunched together before freezing) were taken from a conventional restaurant freezer at ca. −18° C., and were heated using a protocol intended for thawing, wherein a different amount of energy is transmitted at different frequencies, in accordance with an embodiment of U.S. 61/193,248 and a concurrently filed International PCT application.

In a first thawing experiment different amounts of energy were transmitted at different frequencies by transmitting each frequency for the same fixed period of time, while varying the period of transmission, according to an embodiment of '878. A 1500 gr bunch of chicken breasts was heated to 0-5° C. (measured at difference sites of the breasts) in 36 minutes.

In a second thawing experiment different amounts of energy were transmitted at different frequencies by transmitting each frequency at the maximum available power and varying the time of transmission, according to an embodiment of the present invention. A 1715 gr bunch of chicken breasts was heated to 0-5° C. (measured at difference sites of the breasts) in 20 minutes. It was thus observed that in the second thawing experiment, ca. 56% of time needed for the first thawing experiment was sufficient to thaw a larger load.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of irradiating a load placed in a cavity by radiating UHF or microwave radiation into the cavity, the method comprising:
    setting transmission durations, by setting for each of a plurality of frequencies, a respective transmission duration;
    repeatedly causing energy to be transmitted into the cavity at the plurality of frequencies according to a duty cycle, wherein the duty cycle defines an allotted transmission time for each of the plurality of frequencies, and
    switching ON or OFF transmission of the energy at certain frequencies, so that over a plurality of repetitions of the duty cycle the energy is transmitted at each of the plurality of frequencies for the respective transmission duration;
    wherein setting the transmission durations comprises at least one of:
    setting based on dissipation ratios of the plurality frequencies in the load, and
    setting based on Q factors associated with dissipation peaks.

2. The method of claim 1, wherein setting the transmission durations comprises setting based on spectral information retrieved from the cavity.

3. The method of claim 1, wherein setting the transmission durations comprises setting based on the full S parameters of the cavity.

4. The method of claim 1, wherein setting the transmission durations comprises setting based on maximal power that may be transmitted into the cavity at each of the plurality of frequencies.

5. The method of claim 1, wherein the transmission durations are set so that a desired amount of energy is dissipated into the load at any given frequency of the plurality of frequencies.

6. The method of claim 1, wherein the duty cycle defines a multi-frequency pulse and the method comprises selecting the frequencies in the pulse.

7. The method of claim 1, wherein the setting the transmission durations comprises setting according to dissipation information.

8. The method of claim 7, comprising measuring a resulting RC spectrum and inferring the dissipation information from the RC spectrum.

9. The method of claim 1, comprising:
    setting a desired energy to be dissipated at each frequency according to dissipation information; and
    setting the transmission durations according to the set desired energy.

10. The method of claim 1, comprising causing energy to be transmitted at each frequency at a respective maximum power available for the respective frequency.

11. A method of irradiating a load placed in a cavity by radiating UHF or microwave radiation into the cavity, the method comprising:
    setting transmission durations, by setting for each of a plurality of frequencies, a respective transmission duration;
    repeatedly causing energy to be transmitted into the cavity at the plurality of frequencies according to a duty cycle, wherein the duty cycle defines an allotted transmission time for each of the plurality of frequencies, and
    switching ON or OFF transmission of the energy at certain frequencies, so that over a plurality of repetitions of the duty cycle the energy is transmitted at each of the plurality of frequencies for the respective transmission duration;
    wherein setting the transmission durations comprises setting based on Q factors associated with dissipation peaks.

12. A method of irradiating a load placed in a cavity by UHF or microwave radiation, the method comprising:
    setting transmission durations, by setting for each of a plurality of frequencies, a respective transmission duration;
    repeatedly causing energy to be transmitted into the cavity at the plurality of frequencies according to a duty cycle, wherein the duty cycle defines the same allotted transmission time for each of the plurality of frequencies; and
    dynamically selecting the frequencies that appear in each duty cycle;
    wherein setting the transmission durations comprises at least one of:
    setting based on dissipation ratios of the plurality frequencies in the load, and
    setting based on Q factors associated with dissipation peaks.

* * * * *